(12) United States Patent
Das et al.

(10) Patent No.: US 9,253,062 B2
(45) Date of Patent: Feb. 2, 2016

(54) BYTE BY BYTE RECEIVED DATA INTEGRITY CHECK

(75) Inventors: Soumava Das, Kolkata (IN); Sumit Panda, Kolkata (IN); Pratik Ganguly, Kolkata (IN)

(73) Assignee: Ixia, Calabasas, CA (US)

( * ) Notice: Subject to any disclaimer, the term of this patent is extended or adjusted under 35 U.S.C. 154(b) by 136 days.

(21) Appl. No.: 13/336,925

(22) Filed: Dec. 23, 2011

(65) Prior Publication Data

US 2013/0166960 A1 Jun. 27, 2013

(51) Int. Cl.
*G01R 31/28* (2006.01)
*H04L 12/26* (2006.01)

(52) U.S. Cl.
CPC ............ *H04L 43/0847* (2013.01); *H04L 43/50* (2013.01)

(58) Field of Classification Search
CPC ..... H04L 43/0847; H04L 43/50; H04L 12/26; H04L 12/2697; H04L 43/0823; H04L 43/18; H04L 9/0869; H04L 63/067; G06F 17/50; G06F 17/5022; G06F 11/26; G06F 15/173
USPC .................................. 714/715, 47.1, E11.159
See application file for complete search history.

(56) References Cited

U.S. PATENT DOCUMENTS

| | | | | |
|---|---|---|---|---|
| 4,745,593 A | * | 5/1988 | Stewart | H04L 12/56 370/244 |
| 5,673,279 A | * | 9/1997 | Oskouy et al. | 714/819 |
| 5,761,216 A | * | 6/1998 | Sotome et al. | 714/738 |
| 6,654,373 B1 | * | 11/2003 | Maher et al. | 370/392 |
| 6,717,917 B1 | * | 4/2004 | Weissberger et al. | 370/252 |
| 6,775,804 B1 | * | 8/2004 | Dawson | 714/776 |
| 6,782,503 B1 | * | 8/2004 | Dawson | 714/739 |
| 6,856,802 B1 | * | 2/2005 | Kinnunen | H04W 24/00 370/241 |
| 7,058,974 B1 | * | 6/2006 | Maher et al. | 726/13 |
| 7,222,255 B1 | * | 5/2007 | Claessens et al. | 714/4.12 |
| 7,231,558 B2 | * | 6/2007 | Gentieu et al. | 714/704 |
| 7,373,561 B2 | * | 5/2008 | Baumer | G06F 13/4027 714/704 |
| 7,424,744 B1 | * | 9/2008 | Wu et al. | 726/23 |
| 7,826,381 B1 | * | 11/2010 | Kastuar et al. | 370/242 |
| 7,899,642 B2 | * | 3/2011 | Rowse | H04L 1/243 702/122 |
| 2003/0223376 A1 | * | 12/2003 | Elliott et al. | 370/249 |
| 2004/0015722 A1 | * | 1/2004 | Klotz et al. | 713/201 |
| 2004/0208129 A1 | * | 10/2004 | Old et al. | 370/241 |
| 2004/0221163 A1 | * | 11/2004 | Jorgensen | H04L 63/0428 713/182 |
| 2005/0086520 A1 | * | 4/2005 | Dharmapurikar et al. | 713/201 |
| 2005/0120208 A1 | * | 6/2005 | Dobson | 713/160 |
| 2006/0200708 A1 | * | 9/2006 | Gentieu et al. | 714/704 |
| 2006/0259966 A1 | * | 11/2006 | Ilnicki | 726/22 |
| 2006/0285501 A1 | * | 12/2006 | Damm | H04L 41/142 370/252 |
| 2007/0087741 A1 | * | 4/2007 | Noble et al. | 455/423 |
| 2007/0089006 A1 | * | 4/2007 | Zimmerman | G11C 29/022 714/738 |
| 2007/0115833 A1 | * | 5/2007 | Pepper et al. | 370/241 |

(Continued)

*Primary Examiner* — Albert Decady
*Assistant Examiner* — Enamul M Kabir
(74) *Attorney, Agent, or Firm* — SoCal IP Law Group LLP; John E. Gunther; Steven C. Sereboff (57) ABSTRACT

A method and an apparatus for testing a network. A source port unit may generate a packet including a payload, the payload comprising a content identifier and content data in accordance with the content identifier, and transmit the packet via the network. A destination port unit may receive the packet and extract the content identifier and received content data from the received packet. The destination port unit may obtain expected content data in accordance with the extracted content identifier and compare the expected content data and the received content data.

10 Claims, 7 Drawing Sheets

(56) References Cited

U.S. PATENT DOCUMENTS

| | | | |
|---|---|---|---|
| 2007/0253021 A1* | 11/2007 | Mehta | A61B 5/0002 358/1.15 |
| 2007/0258395 A1* | 11/2007 | Jollota | A61B 5/14532 370/310 |
| 2008/0075103 A1* | 3/2008 | Noble et al. | 370/429 |
| 2008/0101254 A1* | 5/2008 | Chew et al. | 370/252 |
| 2008/0187310 A1* | 8/2008 | Tanaka | 398/9 |
| 2010/0034100 A1* | 2/2010 | Beyers | 370/250 |
| 2010/0142398 A1* | 6/2010 | Arad et al. | 370/252 |
| 2010/0251364 A1* | 9/2010 | Lee et al. | 726/22 |
| 2011/0069620 A1* | 3/2011 | Gintis et al. | 370/250 |
| 2011/0238855 A1* | 9/2011 | Korsunsky et al. | 709/231 |
| 2011/0283140 A1* | 11/2011 | Stevens et al. | 714/27 |
| 2013/0064095 A1* | 3/2013 | Chew et al. | 370/241 |

* cited by examiner

BYTE BY BYTE RECEIVED DATA INTEGRITY CHECK

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating traffic for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths. Packet switched networks are governed by a layered structure of industry-standard protocols. Layers 1, 2, and 3 of the structure are the physical layer, the data link layer, and the network layer, respectively.

Layer 1 protocols define the physical (electrical, optical, or wireless) interface between nodes of the network. Layer 1 protocols include various Ethernet physical configurations, the Synchronous Optical Network (SONET) and other optical connection protocols, and various wireless protocols such as WiFi.

Layer 2 protocols govern how data is logically transferred between nodes of the network. Layer 2 protocols include the Ethernet, Asynchronous Transfer Mode (ATM), Frame Relay, and Point to Point Protocol (PPP).

Layer 3 protocols govern how packets are routed from a source to a destination along paths connecting multiple nodes of the network. The dominant layer 3 protocols are the well-known Internet Protocol version 4 (IPv4) and version 6 (IPv6). A packet switched network may need to route IP packets using a mixture of the Ethernet, ATM, FR, and/or PPP layer 2 protocols. At least some of the nodes of the network may include a router that extracts a destination address from a network layer header contained within each packet. The router then used the destination address to determine the route or path along which the packet should be retransmitted. A typical packet may pass through a plurality of routers, each of which repeats the actions of extracting the destination address and determining the route or path along which the packet should be retransmitted.

In order to test a packet switched network or a device included in a packet switched communications network, test traffic comprising a large number of packets may be generated, transmitted into the network at one or more ports, and received at different ports. Each packet in the test traffic may be a unicast packet intended for reception at a specific destination port or a multicast packet, which may be intended for reception at two or more destination ports. In this context, the term "port" refers to a communications connection between the network and the equipment used to test the network. The term "port unit" refers to a module within the network test equipment that connects to the network at a port. The received test traffic may be analyzed to measure the performance of the network. Each port unit connected to the network may be both a source of test traffic and a destination for test traffic. Each port unit may emulate a plurality of logical source or destination addresses. The number of port units and the communications paths that connect the port units to the network are typically fixed for the duration of a test session. The internal structure of the network may change during a test session, for example due to failure of a communications path or hardware device.

Packets transmitted in packet switched network typically contain provisions to allow devices that receive the packets to determine if the packet were transmitted correctly. At a minimum, each packet may include a frame check sequence (FCS) or cyclic redundancy check (CRC) value that allows a receiver to determine if any byte of the packet was unexpectedly changed during transmission. Packets may include additional checksums fields. While a CRC value and checksum fields allow the receiver to determine if the packet was altered or damaged during transmission, such provisions do not allow location of the damaged portion of the packet. Further, CRC and checksum fields are typically calculated immediately before a packet is transmitted and may be checked immediately upon reception of a packet. Thus CRC and checksum fields may not detect a change to a packet that occurs before the checksums are calculated or after the checksums are checked. In some situations, byte-by-byte verification of the integrity of a received packet may be necessary to detect and diagnose errors that occur when a packet is communicated via a network.

A series of packets originating from a single port unit and having a specific type of packet and a specific rate will be referred to herein as a "stream." A source port unit may support multiple outgoing streams simultaneously and concurrently, for example to accommodate multiple packet types, rates, or destinations. "Simultaneously" means "at exactly the same time." "Concurrently" means "within the same time."

Within this description, the term "engine" means a collection of hardware, which may be augmented by firmware and/or software, which performs the described functions. An engine may typically be designed using a hardware description language (HDL) that defines the engine primarily in functional terms. The HDL design may be verified using an HDL simulation tool. The verified HDL design may then be converted into a gate netlist or other physical description of the engine in a process commonly termed "synthesis". The synthesis may be performed automatically using a synthesis tool. The gate netlist or other physical description may be further converted into programming code for implementing the engine in a programmable semiconductor device such as a field programmable gate array (FPGA), a programmable logic device (PLD), a programmable logic arrays (PLA), or other programmable device. The gate netlist or other physical description may be converted into process instructions and masks for fabricating the engine within an application specific integrated circuit (ASIC).

Within this description, a "unit" also means a collection of hardware, which may be augmented by firmware and/or software, which may be on a larger scale than an "engine". For example, a unit may contain multiple engines, some of which may perform similar functions in parallel. The terms "logic", "engine", and "unit" do not imply any physical separation or demarcation. All or portions of one or more units and/or engines may be collocated on a common card, such as a network card, or within a common FPGA, ASIC, or other circuit device.

When one or more engine, logic circuit, and/or unit is implemented by a one or more programmable semiconductor devices, programming code may be stored on a computer readable storage medium. The programming code may then be used to configure the programmable device or devices. The storage medium may be, for example, a magnetic medium such as a hard disk, a floppy disk and a magnetic tape; an optical medium such as a compact disk (CD-ROM and CD-RW) and a digital versatile disk (DVD and DVD±RW); a flash memory card; or another physical object for storing data. The term "storage medium" does not encompass transitory media such as propagating waveforms and signals.

When the function of one or more engine, and/or unit is implemented by a processor executing software instructions, the software instructions may be stored on a computer readable storage medium.

Throughout this description, elements appearing in block diagrams are assigned three-digit reference designators, where the most significant digit is the figure number where the element is introduced and the two least significant digits are specific to the element. An element that is not described in conjunction with a block diagram may be presumed to have the same characteristics and function as a previously-described element having the same reference designator.

In block diagrams, arrow-terminated lines may indicate data paths rather than signals. Each data path may be multiple bits in width. For example, each data path may consist of 4, 8, 16, 64, 256, or more parallel connections.

DETAILED DESCRIPTION

Description of Apparatus

Figure 1:
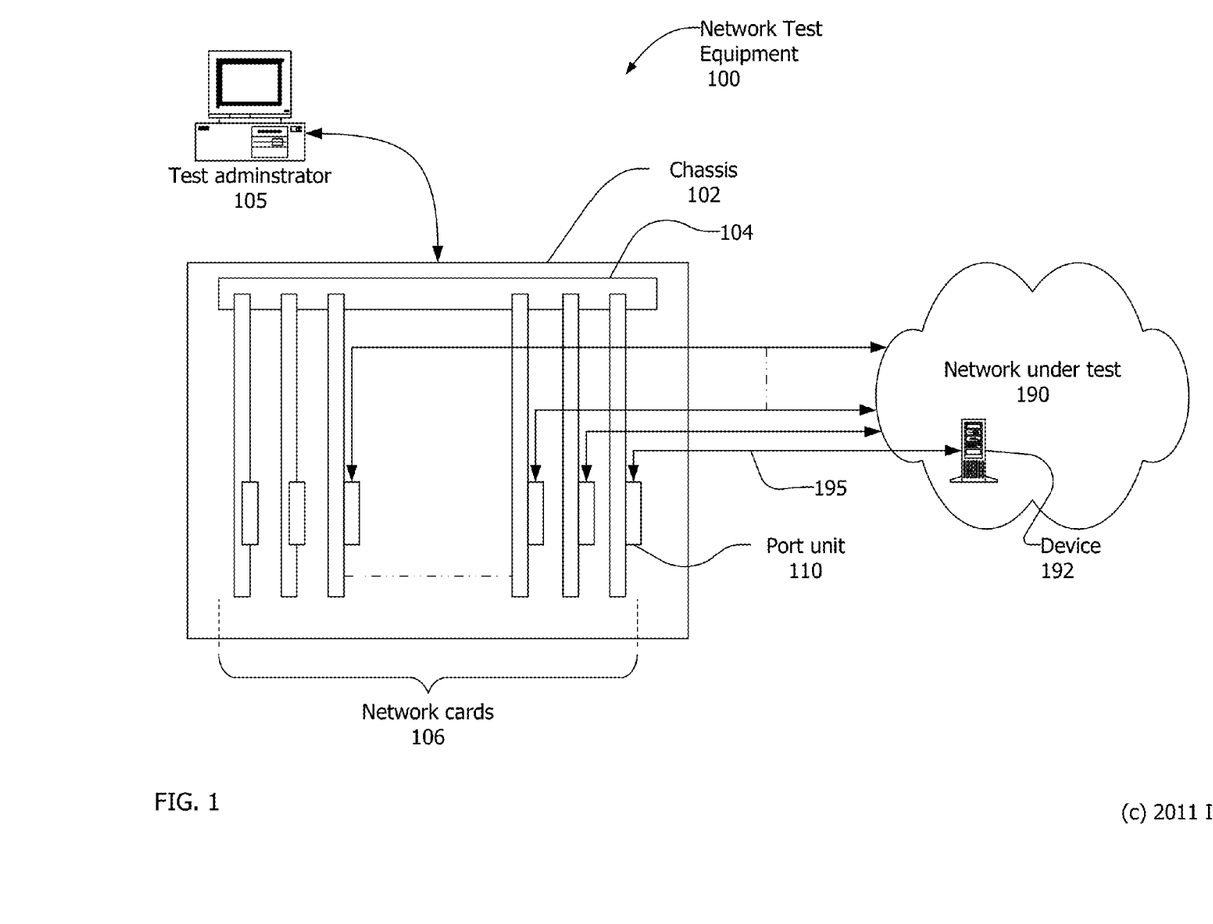
FIG. 1 is a block diagram of a network environment.

FIG. 1 shows a block diagram of a network environment. The environment may include network test equipment 100, a network 190 and plural network devices 192.

The network test equipment 100 may be a network testing device, performance analyzer, conformance validation system, network analyzer, or network management system. The network test equipment 100 may include one or more network cards 106 and a backplane 104 contained or enclosed within a chassis 102. The chassis 102 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 106 may support one or more well known standards or protocols such as the various Ethernet and Fibre Channel standards, and may support proprietary protocols as well.

The network cards 106 may include one or more field programmable gate arrays (FPGAs), application specific integrated circuits (ASICs), programmable logic devices (PLDs), programmable logic arrays (PLAs), processors and other kinds of devices. In addition, the network cards 106 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. The network cards 106 may be permanently installed in the network test equipment 100 or may be removable.

Each network card 106 may contain one or more port unit 110. Each port unit 110 may connect to the network 190 through one or more ports. Each port unit 110 may be connected to the network 190 through a communication medium 195, which may be a wire, an optical fiber, a wireless link, or other communication medium. Each port unit 110 may support a single communications protocol, may support a number of related protocols, or may support a number of unrelated protocols. Each port unit 110 may serve as a source of test traffic and/or a destination for network traffic during a test session.

The backplane 104 may serve as a bus or communications medium for the network cards 106. The backplane 104 may also provide power to the network cards 106.

The network devices 192 may be any devices capable of communicating over the network 190. The network devices 192 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, and multiplexers. In addition, the network devices 192 may include appliances, alarm systems, and any other device or system capable of communicating over a network.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein as packets. The network test equipment 100 and the network devices 192 may communicate simultaneously with one another, and there may be plural logical communications paths between the network test equipment 100 and a given network device 195. The network itself may be comprised of numerous nodes providing numerous physical and logical paths for data to travel.

Figure 2:
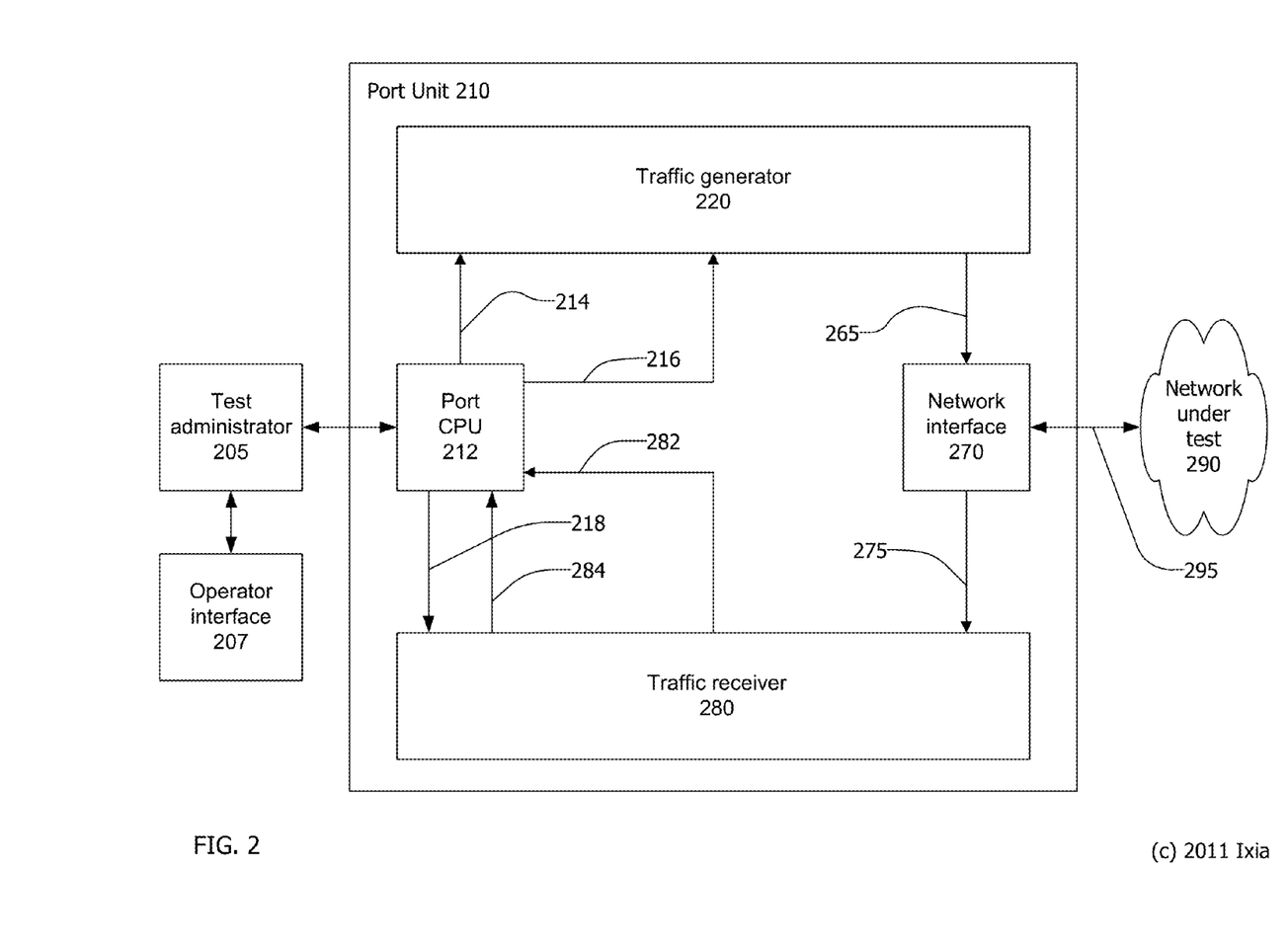
FIG. 2 is a block diagram of a port unit.

Referring now to FIG. 2, an exemplary port unit 210 may include a port central processor unit 212 (CPU), a traffic generator unit 220, a traffic receiver unit 280, and a network interface unit 270 which couples the port unit 210 to a network under test 290. The port unit 210 may be all or part of a network card such as the network cards 106.

The port CPU 212 may include a processor, a memory coupled to the processor, and various specialized units, circuits, software and interfaces for providing the functionality and features described here. The processes, functionality and features may be embodied in whole or in part in software which operates on the processor and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some functions are performed by the processor and others by other devices.

The port CPU 212 may communicate with a test administrator 205, which in turn may communicate with or include an operator interface 207. The test administrator 205 may be a computing device contained within, or external to, the network test equipment 100. The test administrator 205 may provide the port CPU 212 with instructions and data required for the port unit to participate in testing the network 290. The instructions and data received from the test administrator 205 may include, for example, definitions of packet streams to be generated by the port unit 210 and definitions of performance statistics that may be accumulated and reported by the port unit 210.

The port CPU 212 may provide the traffic generator unit 220 with stream forming data 214 to form a plurality of streams. The stream forming data 214 may include, for example, the type of packet, the frequency of transmission, definitions of fixed and variable-content fields within the packet and other information for each packet stream. The traffic generator unit 220 may then generate the plurality of streams in accordance with the stream forming data 214. The plurality of streams may be interleaved to form outgoing traffic 265. Each of the streams may include a sequence of packets. The packets within each stream may be of the same general type but may vary in length and content.

The network interface unit 270 may convert the outgoing traffic 265 from the traffic generator unit 220 into the electrical, optical, or wireless signal format required to transmit the test traffic to the network under test 290 via a link 295. The link 295 may be a wire, an optical fiber, a wireless link, or other communication link. Similarly, the network interface unit 270 may receive electrical, optical, or wireless signals from the network over the link 295 and may convert the received signals into incoming traffic 275 in a format usable to the traffic receiver unit 280.

The traffic receiver unit 280 may receive the incoming traffic 275 from the network interface unit 270. The traffic receiver unit 280 may determine if each received packet is a member of a specific flow, and may accumulate test statistics for each flow in accordance with test instructions 218 provided by the port CPU 212. The accumulated test statistics may include, for example, a total number of received packets, a number of packets received out-of-sequence, a number of received packets with errors, a maximum, average, and minimum propagation delay, and other statistics for each flow. The traffic receiver unit 280 may also capture and store specific packets in accordance with capture criteria included in the test instructions 218. The traffic receiver unit 280 may provide test statistics and/or captured packets 284 to the port CPU 212, in accordance with the test instructions 218, for additional analysis during, or subsequent to, the test session.

Some amount of interactive communications may be required or desired between the port unit 210 and the network 290 during a test session. For example, the traffic receiver unit 280 may receive incoming CPU packets, which are packets containing data that requires special processing and/or that require the port unit 210 to send an acknowledgement or response. The traffic receiver unit 280 may separate incoming CPU packets from the incoming traffic and may route the incoming CPU packets 282 to the port CPU 212. The port CPU 212 may extract the content of each control packet and may generate an appropriate response in the form of outgoing CPU traffic 216. Outgoing CPU traffic 216 may be provided to the traffic generator unit 220. The traffic generator unit 220 may insert the outgoing CPU traffic 216 into the outgoing traffic 265.

Figure 3:
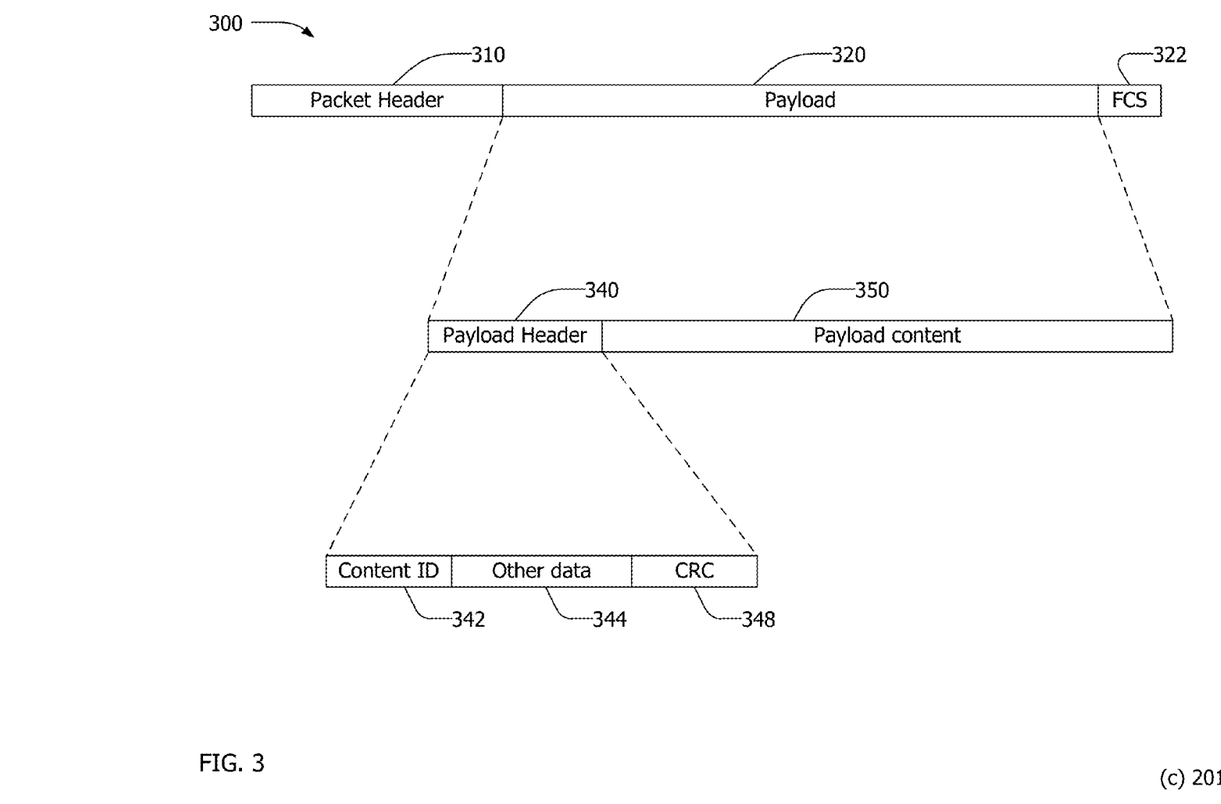
FIG. 3 is a graphical representation of a packet.

Referring now to FIG. 3, a packet 300 for transmission over a network may include a packet header 310, a payload 320, and frame check sequence (FCS) 322. The packet header 310 may include addressing information required to route the packet through a network. For example, the packet header 310 may include a header for a media access layer (layer 2) protocol such as point-to-point protocol or an Ethernet protocol, and a header for a network layer (layer 3) protocol which is typically Internet Protocol. The packet header 310 may optionally include a header for a transport layer (layer 4) protocol such as Transmission Control Protocol (TCP) or User Datagram Protocol (UDP). The packet header 310 may be in accordance with any of numerous other protocols used for data transmission. The packet header 310 may contain one or more checksums calculated over respective poretions of the packet header and/or payload.

The FCS 322 at the end of the packet 300 may be a cyclic redundancy check value or checksum calculated by a source device over the entire length of the packet when the packet is transmitted. When the packet is received, a destination device may recalculate the FCS value as the packet is received and then compare the recalculated FCS with the FCS contained within the packet to determine if the packet was damaged or unintentionally altered during transmission. The destination device may also recalculate and compare one or more checksums contained within the packet header. A comparison of the checksum and FCS values may provide an indication that the packet was damaged during transmission, but does not guarantee that the packet was communicated without error.

Figure 4:
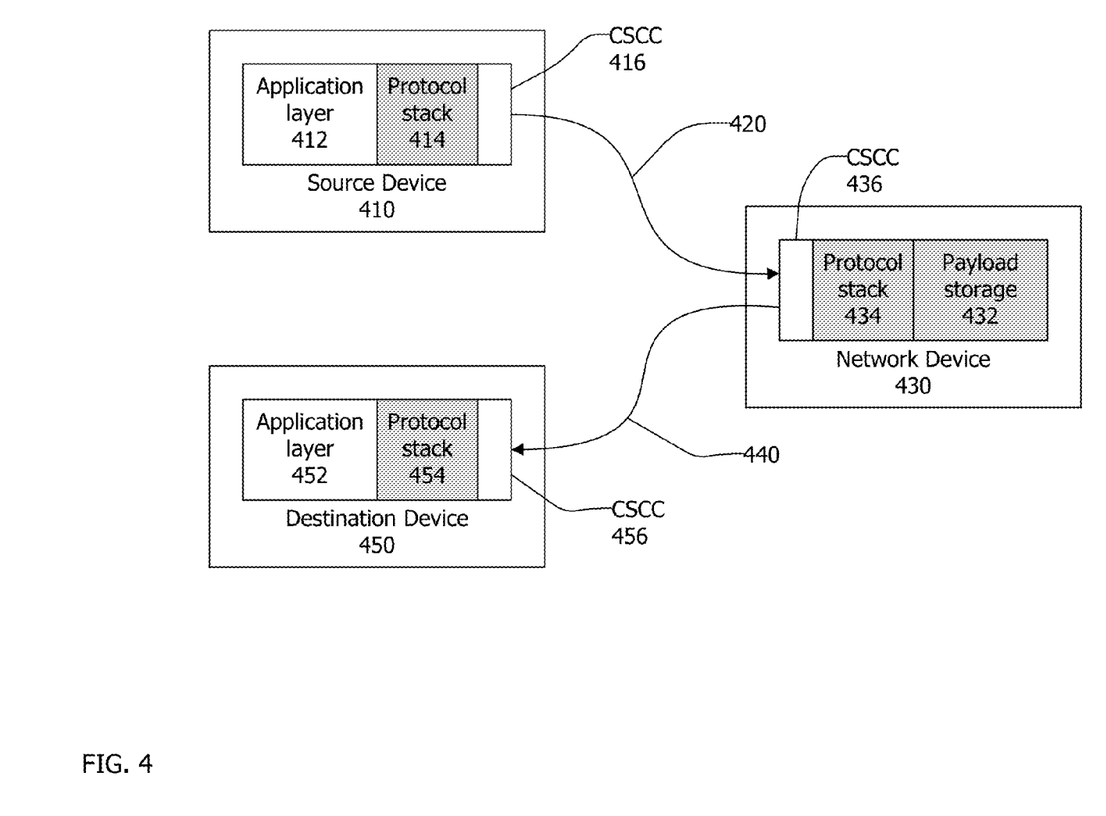
FIG. 4 is a block diagram of an exemplary network.

Referring now to FIG. 4, a simplified exemplary network 400 may consist of a source device 410, a network device 430, and a destination device 450. In this example, the source device 410 sends a packet to the destination device 450 via a first communications link 420, the network device 430 and a second communications link 440.

The source device 410 includes an application layer 412 that defines payload content to be transmitted to the destination device. The source device 410 also includes a protocol stack 414 that receives the payload content from the application layer 412 and builds headers for one or more packets that will be used to convey the payload content to the destination device. The term "protocol stack" encompasses both software and hardware used to interface between the application layer 412 and the communications link 420. The source device 410 may include a checksum calculator/checker (CSCC) 416 to calculate one or more checksums, such as the FCS 322, to be included in the each transmitted packet. The CSCC 416 may be a portion of the protocol stack software or may be specialized hardware. The calculation of checksums by the CSCC 416 may be one of the last operations undertaken by the source device 410 prior to transmitting each packet. Any change made to the payload content within the protocol stack 414 before the checksums are calculated will not be detectable based on the checksums calculated by the CSC 416.

A packet transmitted from the source device 410 over the communications link 420 may be received by the network device 430. The network device 430 may include payload storage 432, a protocol stack 434, and a CSCC 436. The CSCC 436 may check one or more checksums nearly immediately upon receipt of each packet. If the CSCC 436 determines that a received packet is damaged, the network device may discard the received packet or take some other action. When the CSCC determines that the packet was not damaged during transmission (which is to say not damaged between the time the checksums were calculated by the CSCC 416 and the time the checksums were checked by the CSCC 436), the protocol stack 434 may process the header of the received packet and the payload content of the received packet may be temporarily stored in the payload storage 432. In some cases, the payload content may also be processed by an application layer (not shown) within the network device 430.

The protocol stack 434 may then build a header for the outgoing packet to be transmitted to the destination device 450. In most cases, the header of the outgoing packet will not be identical to the header of the received packet. Thus, in most cases, one of the last actions taken before transmitting the outgoing packet will be the CSCC 436 calculating one or more new checksums. Any changes to the payload content that occur within the network device 430 after the checksums of the received packet are checked by the CSCC 436 until the new checksums are calculated by the CSCC 436 will not be detectable based on the checksums within the outgoing packet.

A packet transmitted from the network device 430 over the communications link 440 may be received by the destination device 450. The destination device 450 may include an application layer 452, a protocol stack 454, and a CSCC 456. The CSCC 456 may check one or more checksums nearly immediately upon receipt of each packet. The CSCC 465 may detect damage to the packet that occurs between the time the checksums were calculated by the CSCC 446 and the time the checksums were checked by the CSCC 456. When the CSCC determines that the packet was not damaged, the protocol stack 454 may process the header of the received packet and pass the payload content of the received packet to the application layer 452. Any change made to the payload content within the protocol stack 454 after the checksums were checked by the CSCC 456 may not be detectable to the application layer 452.

To summarize FIG. 4, changes made to payload content that occur while the content is being transmitted by a source device, being stored or processed by an intermediate device such as the network device 430, or being received by a destination device (i.e. the shaded elements in FIG. 4) are not necessarily detectable using conventional checksums placed within packets. Thus, in some circumstances, byte-by-byte payload integrity checking may be necessary to detect and diagnose network problems.

Returning now to FIG. 3, to allow byte-by-byte data integrity checking of received packets, the payload 320 of a packet transmitted by a source port unit may be filled with data that is either known or knowable to a destination port unit such that the destination port unit can perform a byte-by-byte comparison of the received payload content and the expected payload content. The payload data is known to the destination port unit if, for example, the payload data is provided to the destination port unit before the packet is transmitted. The payload data is knowable to the destination port unit if the payload data can be independently derived by the destination port unit upon reception of the packet.

For example, a random data pattern, or sequence of random data bytes, at least as long as the longest anticipated packet payload could be calculated and stored within each port unit prior to the start of a test session. Each source port unit could then fill the payloads of packets with as much of the random data pattern as required by the packet length. Each destination port unit could compare the received payload content with the pre-stored expected payload content. This approach would allow byte-by-byte received data integrity checking. However, since the payloads of all packets would be similar or identical, this approach would not necessarily allow detection or diagnosis of any transmission errors dependent upon packet payload content.

To provide variability in the packet payload content, a plurality of random data patterns, each as long as the longest anticipated packet payload, may be calculated and then stored within each port unit prior to the start of a test session. Each source port unit may then fill the payload of each packet with all or a portion of one of the random data patterns. In order for the destination port unit to determine which random data pattern was used to fill the payload a received packet, the packet payload may include a payload header 340 followed by payload content 350.

The payload header 340 may, as a minimum, include a content identifier 342 that identifies which of the plurality of random data patterns was used to fill the subsequent payload content 350. For example, 256 different random data patterns could be stored at each port unit. In this case, the content ID may be a single byte that identifies which data pattern was used to fill the packet payload.

Figure 5:
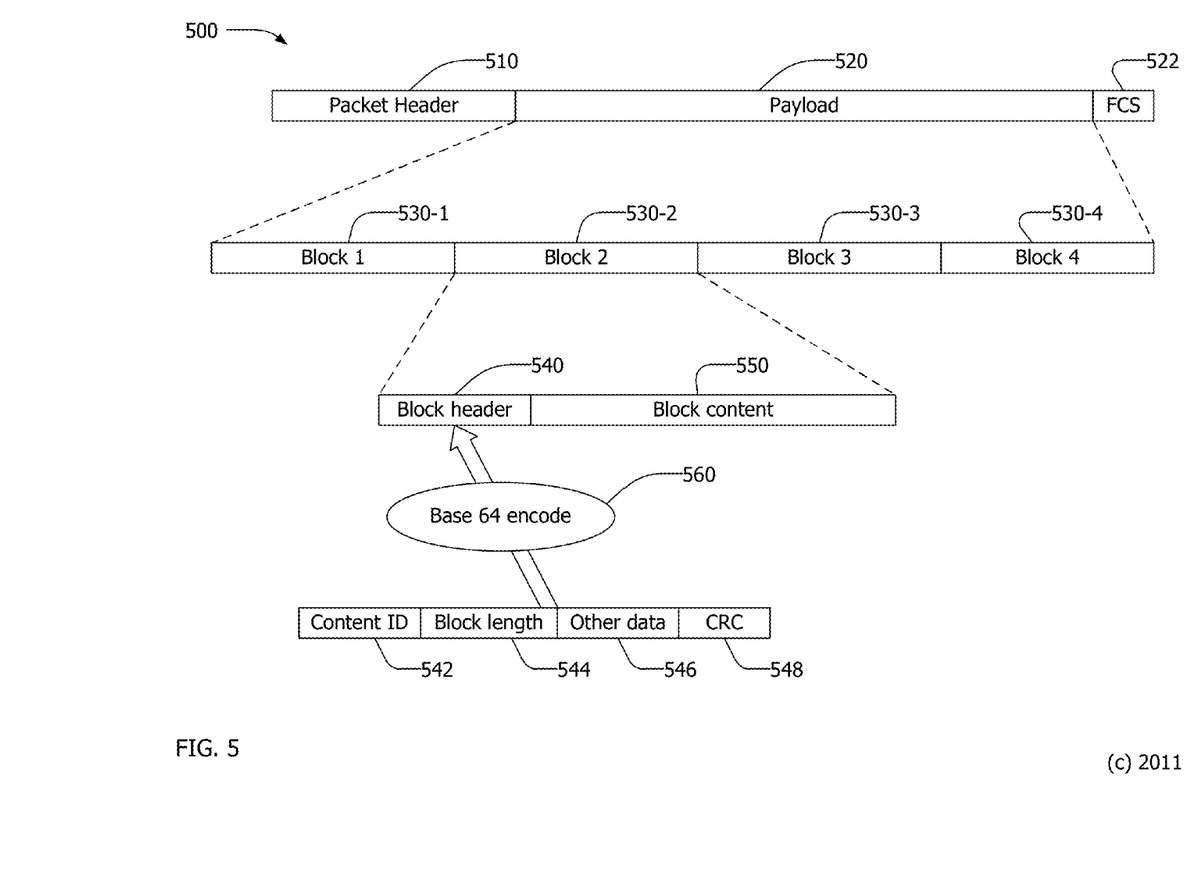
FIG. 5 is a graphical representation of another packet.

The payload header 340 may include other data 344 in addition to the content ID 342. For example, other data such as timestamp, a sequence number, or a random value may be included in the payload header 340 to distinguish each packet from other packets. The payload header 340 may include a payload length (not shown). Alternatively, the payload length may be determined based upon a total length of the packet contained in the packet header 310. The payload header 340 may also include a cyclic redundancy check value or checksum 348 calculated over the other fields of the payload header. Inclusion of the CRC 348 in each transmitted packet may allow a destination port unit that receives the packet to verify the integrity of the payload header Storing a plurality of long random data patterns may require a substantial amount of memory at each port unit. To reduce the amount of memory required while providing an even greater variety of possible payload content, the payload of each packet may be divided into two or more blocks, as shown in FIG. 5. In the example of FIG. 5, a packet 500 includes a packet header 510 and a frame check sequence 522 as previously described and a payload 520 divided into four blocks 530-1, 530-2, 530-3, 530-4. A packet payload may contain more or fewer than four blocks. Each block may be limited to a maximum length of, for example, 512 or 1024 bytes. Each packet payload may be divided into as many blocks as required to fill a predetermined length of the packet. For example, a packet payload of 4000 bytes may be divided into three blocks of 1024 bytes and a final block of 928 bytes.

Each block 530-1 to 530-4 may include a respective block header 540 and block content 550. The block header 540 may include, as a minimum, a content ID 542 and a block length 544. The content ID 542 may identify one of a plurality of random data patterns used to fill the associated block content. The block length 544 may define either the length of the block or the length of the block content. Each block header 540 may include other data 546 in addition to the content ID 541 and block length 544. For example, other data such as timestamp, a sequence number, or a random value may be included in the block header 546 to distinguish each block from other blocks. The block header 540 may also include a cyclic redundancy check value or checksum 548 calculated over the other fields of the block header.

Some application layer protocols, such as Simple Mail Transfer Protocol (SMTP), presume the payload data will be characters from the ASCII character set. Such protocols expect each payload byte to be one of 64 or 128 allowable characters. These protocols may not be "8-bit clean", which is to say the protocols may not be robust for content values other than the expected characters. For example, the most significant bit of each byte may be automatically set to zero during transmission.

To provide compatibility with protocols that are not 8-bit clean, the random data patterns used to fill packet payloads may be random ASCII character strings. To ensure that the payload header or block headers are compatible with these protocols, the block header 540 may be base 64 encoded 560. Base 64 encoding is a standard technique to convert binary data into text data for transmission via media or protocols that are limited to text data. In over-simplified terms, three bytes (24 bits) of binary data may be partitioned into four 6-bit segments that are then mapped to four bytes of ASCII characters.

In the example of FIG. 5, the content ID 542 may be one byte, the block length 544 may be two bytes, the other data 546 may be five bytes, and the CRC 548 may be four bytes. These 12 bytes may be base 64 encoded 560 into 16 bytes to form the block header 540.

As an alternative to, or in addition to, storing a plurality of predetermined random data patterns at each port unit, all source and destination port units could be equipped with identical random data generators. The random data generator may be, for example, dedicated hardware or an algorithm executed by the port CPU within each port unit. Source port units may then fill the payload of each packet or block with random data generated using the content ID portion (342, 542) of the packet or block header (340, 540) to seed the random data generator. Destination port units may then extract the seed from each received packet, calculate the same random data, and compare the received payload content with the calculated expected payload content. This approach would also allow byte-by-byte payload data integrity checking at the cost of substantial processing within the source and destination port units.

A test system may be configured to use both predetermined random data and calculated random data to fill packet payloads. For example, each payload header or block header may include an 8-bit payload identifier. A payload identifier value from 00 to 7F may identify one of 128 predetermined random data patterns that may be stored at each port unit. A payload identifier value from 80 to FF may be used as a seed for a random number generator.

Description of Processes

Figure 6:
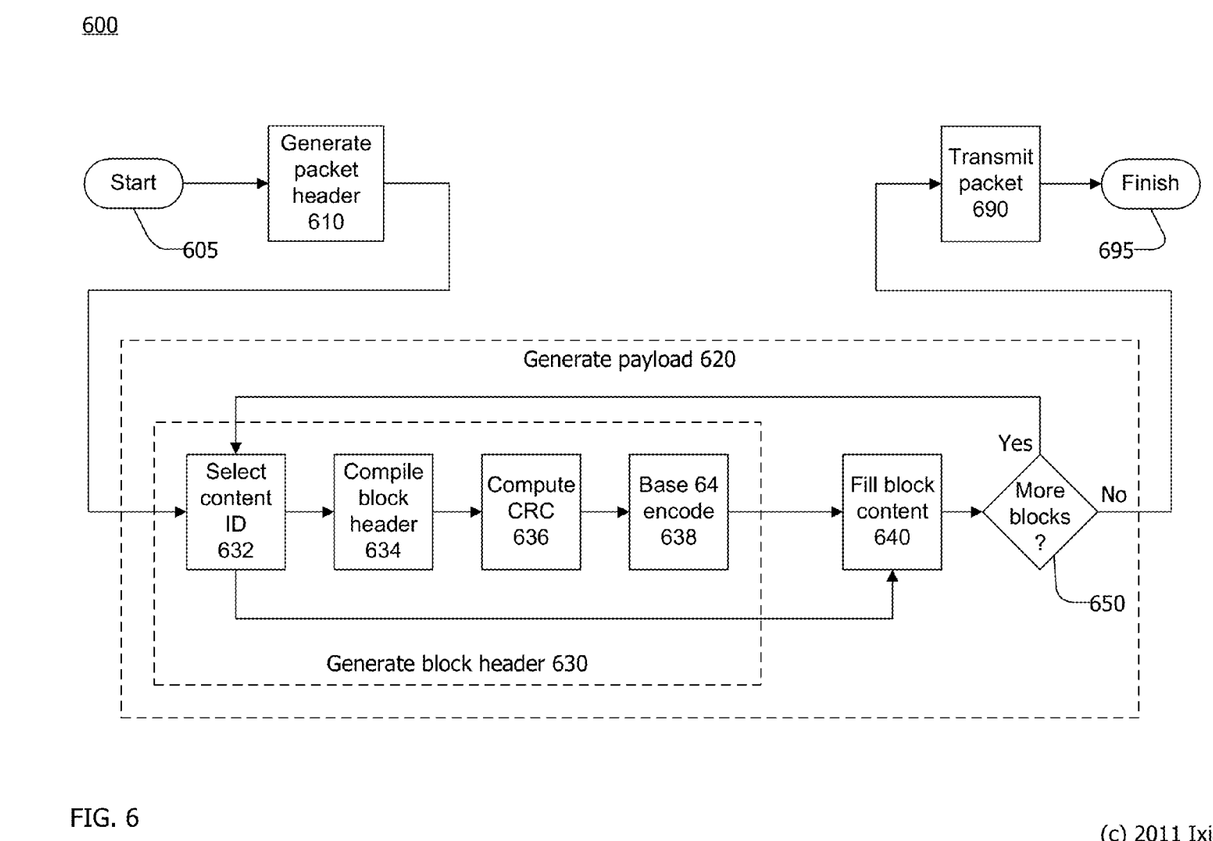
FIG. 6 is a flow chart of a process for generating a packet.

Referring now to FIG. 6, a process 600 for generating a packet may be performed by a port unit such as the port unit 210 of FIG. 2. The process 600 may be implemented within a hardware traffic generator unit, such as the traffic generator 220. The process 600 may be implemented by a processor, such as the port CPU 212, executing appropriate software instructions. Portions of the process 600 may be performed by a processor and software, and other portions may be performed by hardware. The flow chart of FIG. 6 shows the process 600 as performed by a single port unit to generate a single packet. The process 600 may be performed in parallel by a plurality of port units and may be performed repeatedly by each port unit during a test session.

The process 600 may start at 605 and may end at 695 after the packet has been transmitted. At 605, the port unit may have received an instruction to generate a packet configured to allow byte-by-byte payload integrity checking. When the process 600 is implemented by a hardware traffic generator, the instruction may be received, for example, from a processor such as the associated port CPU. When the process 600 is implemented using a processor executing software, the instruction may be self-generated, which is to say the instruction may be generated by other software running on the same processor. The instruction may define an overall length of the packet.

At 610, a packet header may be generated. The packet header may be generated based on information, for example a protocol type and source and destination IP addresses, contained within the instruction received at 605.

A payload for the packet may be generated at 620. The payload may consist of one or more blocks, as shown in FIG. 5. Each block within the payload may include a block header and block content. The actions from 632 to 650 may be repeated for each block of a packet having more than one payload block.

At 630, the block header may be generated. At 632, a content identifier may be selected. The content identifier may be selected by generating a random value, by incrementing or otherwise modifying a previous value, or by extracting a value from some other information such as a real time clock or portions of the packet header. The content ID may be selected in some other manner.

At 634, the block header may be compiled. The block header may include the content ID from 632, a block length, and optional other information such as a timestamp. At 636, a cyclic redundancy check value may be calculated over the information from 634. At 638, the block header, including the information from 634 and the CRC from 636, may be base 64 encoded to complete the block header. Base 64 encoding at 638 is optional and may only be necessary if the protocol and/or medium used to transmit the packet are not 8-bit clean.

At 640, the block content may be filled in accordance with the content ID selected at 632. The content ID may identify one of a plurality of predetermined data patterns stored in memory within the source port unit. Each of the plurality of data patterns may comprise a string of random bytes, a string of random ASCII characters, or a repeating pattern of data bytes or characters. When the content ID identifies a predetermined data pattern, the block content may be filled at 640 by retrieving as much of the selected data pattern as is required to fill the block.

The content ID may be used as a seed for a random data generator. In this case, the block content may be filled at 640 by randomly generating data bytes or characters using a random data generator seeded with the content ID.

At 650, a determination may be made if additional blocks are required to fill the packet payload. If additional blocks are necessary, the actions from 632 to 650 may be repeated until the packet payload is complete. The packet may then be transmitted at 690 and the process 600 may finish at 695.

Although the process 600 was shown and described as a series of sequential actions, portions of the process may be performed concurrently. For example, the packet header may be generated at 610 in parallel with generating the payload at 620, and transmission of the packet at 690 may be started before the generation of the payload at 620 is completed.

Figure 7:
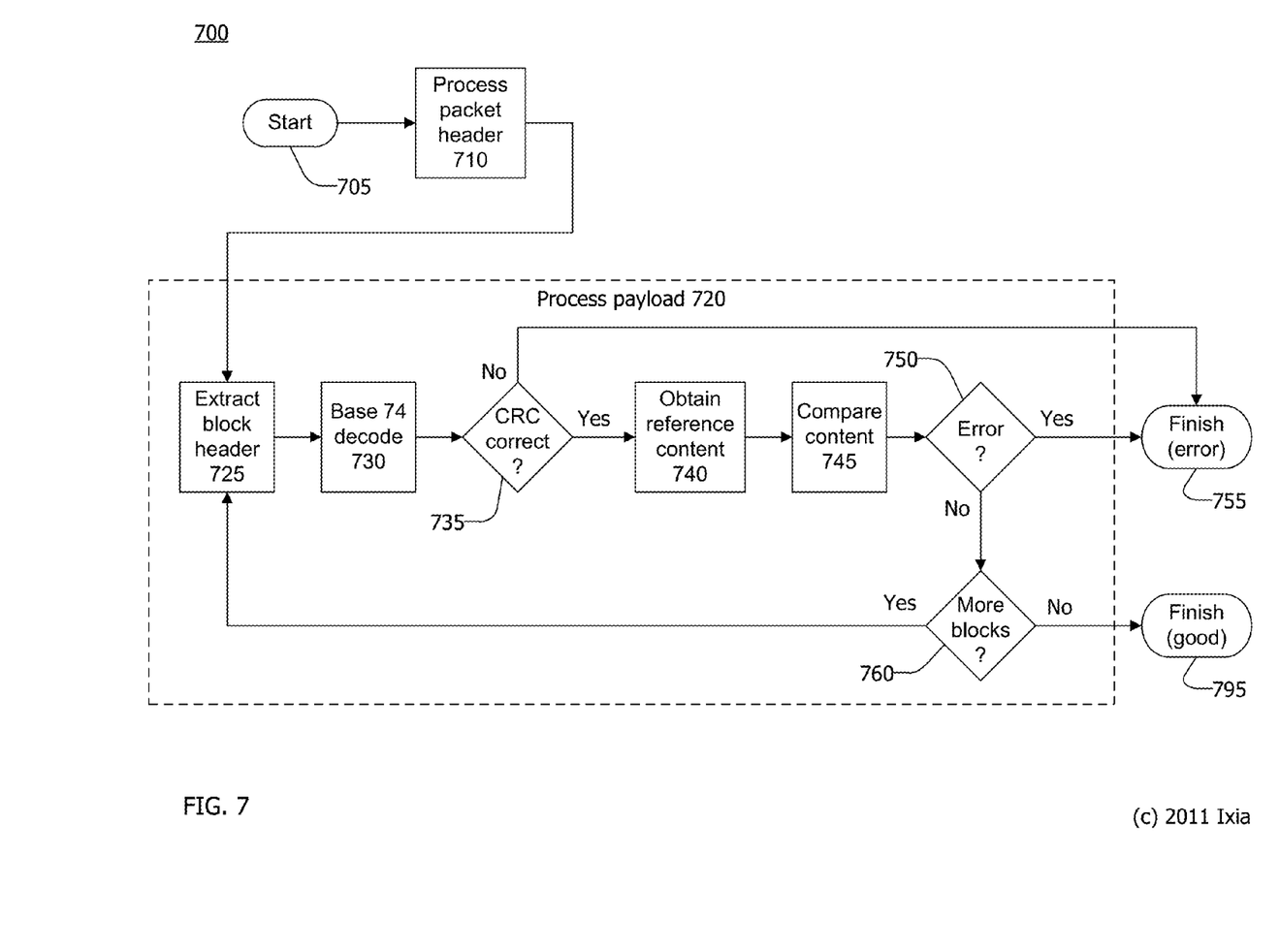
FIG. 7 is a flow chart of a process for checking the data integrity of a received packet.

Referring now to FIG. 7, a process 700 for receiving a packet may start at 705 when a packet, which may be the packet transmitted at 590 in the process 500, is received. The process 700 may end at 755 or 795 after the received packet has been processed. The process 700 may be implemented within a hardware traffic receiver unit, such as the traffic generator 280. The process 700 may be implemented by a processor, such as the port CPU 212, executing appropriate software instructions. Portions of the process 700 may be performed by a processor and software, and other portions may be performed by hardware. The flow chart of FIG. 7 shows the process 700 as performed by a single port unit to receive a single packet. It should be understood that the process 700 may be performed in parallel by a plurality of port units and may be performed repeatedly by each port unit during a test session.

At 710, the packet header of the received packet may be processed. The amount of processing performed at 710 may depend on the nature of the network test being conducted. At a minimum, the packet header may be processed at 710 only to the extent necessary to determine when the payload begins within the packet. Typically, checksums within the packet header may also be verified. When the network test requires establishment and verification of TCP connections, the packet header may be parsed and information, such as IP addresses and port numbers, necessary to maintain the TCP connection may be extracted.

After, or in parallel with, processing the packet header at 710, a payload of the packet may be processed at 720. To process the payload, a first block header may be extracted from the packet payload at 725. When appropriate, the extracted block header may be base 64 decoded (converted from a text string to binary data) at 730. When present, a CRC within the block header may be verified at 735. If the CRC is incorrect, the process 700 may end at 755. When the process terminates at 755, data may be stored and/or a message may be sent indicating that an error occurred during transmission of the packet and that the error occurred within the block header.

When a determination is made at 735 that the CRC was correct, the expected content of the block payload may be obtained at 740. The expected content may be obtained by first extracting a content identifier from the block header and then retrieving the expected content from a memory using the content identifier as an index or pointer to locate the expected content in the memory. Alternatively, the expected content may be obtained by extracting the content identifier from the block header and then using the content identifier as a seed to randomly generate the expected content.

At 745, the received block payload and the expected content may be compared on a byte-by-byte basis. At 750, a determination may be made if an error occurred during transmission, which is to say if any byte of the received block payload does not match the corresponding byte of the expected content. If an error has occurred, the process 700 may end at 755. When the process terminates at 755, data may be stored and/or a message may be sent indicating that an error occurred during transmission of the packet and that the error occurred at a specific byte within the block payload.

When every byte of the block payload matches the corresponding byte of the expected content, a determination may be made at 750 that the block was received correctly and that no error occurred during transmission of the block. In this case, a determination may be made at 760 whether or not the received packet contains additional blocks. When more blocks are present, the actions from 725 to 760 may be repeated for each additional block. When no more blocks are present, the process 700 may end at 795. When the process terminates at 795, data may be stored, or a message may be sent, indicating that the packet was received without error.

Each destination port unit involved in a network test may maintain statistics indicating the number of correctly and incorrectly received packets and the locations within incorrectly received packet where an error occurred during transmission. This information may be subsequently analyzed to diagnose problems within the network under test.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for testing a network, comprising:
   a source port unit
      generating a packet addressed to a destination port unit, the packet including a payload comprising a plurality of blocks, each block containing a respective content identifier and respective content data generated using the respective content identifier as a seed for a first random data generator; and
      transmitting the packet via the network;
   the destination port unit
      receiving the packet; and
      for each of the plurality of blocks independently:
         extracting the respective content identifier and respective received content data from the received packet;
         generating respective expected content data using the extracted respective content identifier as a seed for a second random data generator the same as the first random data generator; and
         comparing the respective expected content data and the respective received content data.

2. The method of claim 1, wherein each block includes a block header containing the respective content identifier and a respective block length.

3. The method of claim 2, wherein each block header includes a respective timestamp.

4. The method of claim 2, wherein each block header includes a respective cyclic redundancy check value.

5. An apparatus for testing a network, comprising:
a source port unit configured to
generate a packet addressed to a destination port unit, the packet including a payload comprising a plurality of blocks, each block containing a respective content identifier and respective content data generated using the respective content identifier as a seed for a first random data generator, and
transmit the packet via the network; wherein
the destination port unit is configured to
receive the packet, and
for each of the plurality of blocks independently:
extract the respective content identifier and respective received content data from the received packet,
generate respective expected content data using the extracted respective content identifier as a seed for a second random data generator the same as the first random data generator, and
compare the respective expected content data and the respective received content data.

6. The apparatus of claim 5, wherein each block includes a block header containing the respective content identifier and a respective block length.

7. The apparatus of claim 6, wherein each block header includes a respective timestamp.

8. The apparatus of claim 6, wherein each block header includes a respective cyclic redundancy check value.

9. A method for generating traffic to test a network, comprising:
a source port unit generating a packet addressed to a destination port unit, the packet including a payload comprising a plurality of blocks, each block containing a respective content identifier and respective content data generated using the content identifier as a seed for a random data generator.

10. A method for processing a packet, the packet including a payload comprising a plurality of blocks, each block containing a respective content identifier and respective content data generated using the content identifier as a seed for a random data generator, the method comprising:
receiving the packet via a network; and
for each of the plurality of blocks independently:
extracting the respective content identifier and respective received content data from the received packet;
generating respective expected content data using the extracted respective content identifier as a seed for a random data generator; and
comparing the respective expected content data and the respective received content data.

* * * * *